United States Patent
Yamaji et al.

(10) Patent No.: US 9,721,189 B2
(45) Date of Patent: Aug. 1, 2017

(54) IMAGE PROCESSING APPARATUS, IMAGE PROCESSING METHOD, AND RECORDING MEDIUM

(71) Applicant: FUJIFILM Corporation, Tokyo (JP)

(72) Inventors: Kei Yamaji, Tokyo (JP); Teruyoshi Nakashima, Tokyo (JP); Tomoya Nagasaka, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 143 days.

(21) Appl. No.: 14/837,287

(22) Filed: Aug. 27, 2015

(65) Prior Publication Data
US 2016/0078322 A1 Mar. 17, 2016

(30) Foreign Application Priority Data

Sep. 12, 2014 (JP) ................................. 2014-187014

(51) Int. Cl.
| G06K 9/62 | (2006.01) |
| H04N 1/00 | (2006.01) |
| G06T 1/00 | (2006.01) |
| G06T 7/00 | (2017.01) |

(52) U.S. Cl.
CPC .......... *G06K 9/6267* (2013.01); *G06T 1/0007* (2013.01); *G06T 7/97* (2017.01); *H04N 1/00* (2013.01); *G06T 2207/20212* (2013.01)

(58) Field of Classification Search
CPC ...... G06K 9/6267; G06K 7/97; G06T 1/0007; G06T 2207/20212; H04N 1/10
See application file for complete search history.

(56) References Cited

U.S. PATENT DOCUMENTS

| 7,362,919 | B2  | 4/2008  | Das et al. |
| 7,711,211 | B2* | 5/2010  | Snowdon ........... H04N 1/00132 358/403 |
| 8,914,847 | B2* | 12/2014 | Pall ........................ G06F 21/32 713/183 |
| 2001/0048802 | A1 | 12/2001 | Nakajima et al. |
| 2003/0128877 | A1 | 7/2003 | Nicponski |

(Continued)

FOREIGN PATENT DOCUMENTS

| JP | 2013-020325 | 1/2013 |
| WO | 2004/055696 | 7/2004 |

OTHER PUBLICATIONS

Extended European Search Report—EP 15 18 2968—May 23, 2016.

*Primary Examiner* — Samir Ahmed
(74) *Attorney, Agent, or Firm* — Young & Thompson (57) ABSTRACT

In the image processing apparatus, the theme determiner determines a theme of the image group based on the image analysis information, and the preference analyzer analyzes a preference of the user based on the theme of the image group. The composite image generator uses a certain number of images corresponding to the preference of the user selected, respectively, from among the plurality of images to generate composite images of a plurality of patterns. The display controller performs control such that one composite image is displayed on the image monitor and, the one composite image displayed on the image monitor is replaced with one composite image designated by the instruction from among the composite images of the plurality of patterns to display the one composite image designated on the image monitor.

20 Claims, 7 Drawing Sheets

(56) References Cited

U.S. PATENT DOCUMENTS

| | | | |
|---|---|---|---|
| 2004/0250205 A1* | 12/2004 | Conning | G06F 17/3089 715/243 |
| 2009/0116752 A1* | 5/2009 | Isomura | G06F 17/30265 382/217 |
| 2011/0074819 A1* | 3/2011 | Yamaji | G06F 17/30247 345/634 |
| 2011/0074977 A1* | 3/2011 | Yamaji | H04N 5/232 348/239 |
| 2012/0096356 A1* | 4/2012 | Ubillos | G11B 27/034 715/723 |
| 2012/0321223 A1* | 12/2012 | Nagasaka | H04N 1/00448 382/305 |
| 2013/0051670 A1* | 2/2013 | Das | G06F 17/30056 382/170 |
| 2013/0060854 A1 | 3/2013 | Nakano | |
| 2013/0250131 A1 | 9/2013 | Yamaji et al. | |
| 2013/0314561 A1* | 11/2013 | Balannik | H04N 5/2258 348/222.1 |
| 2014/0078177 A1 | 3/2014 | Yamaji et al. | |
| 2014/0139622 A1* | 5/2014 | Sugiyama | H04N 1/3876 348/36 |
| 2014/0241629 A1* | 8/2014 | Lerios | G06T 9/00 382/166 |

\* cited by examiner

IMAGE PROCESSING APPARATUS, IMAGE PROCESSING METHOD, AND RECORDING MEDIUM

CROSS-REFERENCE TO RELATED APPLICATIONS

The present application claims priority under 35 U.S.C. §119 to Japanese Patent Application No. 2014-187014, filed on Sep. 12, 2014. The above application is hereby expressly incorporated by reference, in its entirety, into the present application.

BACKGROUND OF THE INVENTION

The present invention relates to an image processing apparatus, an image processing method, and a recording medium with which composite images (photographic products) of a plurality of patterns are automatically generated from an image group having a plurality of images owned by a user and are proposed to the user.

For example, in a photo book, a certain number of images from among an image group having a plurality of images (image data) owned by a user are selected, and the selected certain number of images are used to create a collection of photographs (a photo album) having a layout desired by the user. However, there has been a problem in that considerable time and effort is required for the user to select images him or herself that the user wishes to use in a photo book from among a plurality of images owned by the user and to decide upon a layout for the photo book, in other words, how to arrange the images in each page of the photo book.

In this regard, at present, automatic layout functions have been realized with which, for example, the photographing period of images and the number of pages of a photo book are designated so that a certain number of images designated according to the photographing period are automatically selected from among a plurality of images, and the selected certain number of images are used to automatically generate a layout for each page of the photo book designated according to the number of pages. The user can thereby easily create a photo book from a plurality of images owned by the user without requiring time and effort.

However, in conventional automatic layout functions, there has been a problem in that it is difficult to understand the theme of an image group in order to propose, to the user, a photo book that corresponds to the preference of the user. Furthermore, photographic products also include shuffle prints (where a plurality of images are arranged in a random order on one mount), postcards, normal photograph prints, and the like besides photo books; however, all of these have the same problem when constituting a photographic product that requires a composite image to be generated using a certain number of images.

In this regard, Patent Document 1 (JP 2013-20325 A) is a prior art document that is related to the present invention.

Patent Document 1 discloses an information processing apparatus that distributes images for a friend of a user. In such an apparatus, the relationship between the user and the friend is determined by determining section based on the activity of the user on a network, images for the friend are acquired by an acquiring section in accordance with the determination made by the determining section, the images acquired by the acquiring section are arranged by a layout section, and the images arranged by the layout section are distributed to the friend by a distributor.

SUMMARY OF THE INVENTION

An object of the present invention is to provide an image processing apparatus, an image processing method, and a recording medium with which the problems of the conventional technology are eliminated and an optimum composite image corresponding to the theme of an image group and the preference of the user can be proposed to the user.

In order to attain the object described above, the present invention provides an image processing apparatus comprising:

an image acquiring unit that acquires an image group having a plurality of images owned by a user;

an image analysis information acquiring unit that acquires image analysis information of each of the plurality of images;

a theme determiner that determines a theme of the image group from among predefined themes based on the image analysis information;

a preference analyzer that analyzes a preference of the user from among predefined preferences based on the theme of the image group;

a composite image generator that selects a certain number of images corresponding to the preference of the user from among the plurality of images based on the image analysis information and uses the certain number of images selected to generate composite images of a plurality of patterns selected from among predefined patterns;

an instruction input unit that receives an instruction input by the user;

an image monitor that displays an image; and a display controller that performs control such that one composite image selected from among the composite images of the plurality of patterns is displayed on the image monitor and, based on an instruction input by way of the instruction input unit, the one composite image displayed on the image monitor is replaced with one composite image designated by the instruction from among the composite images of the plurality of patterns to display the one composite image designated on the image monitor.

Also, the present invention provides an image processing method comprising the steps of:

acquiring, using an image acquiring unit, an image group having a plurality of images owned by a user;

acquiring, using an image analysis information acquiring unit, image analysis information of each of the plurality of images;

determining, using a theme determiner, a theme of the image group from among predefined themes based on the image analysis information;

analyzing, using a preference analyzer, a preference of the user from among predefined preferences based on the theme of the image group;

selecting, using a composite image generator, a certain number of images corresponding to the preference of the user from among the plurality of images based on the image analysis information and using the certain number of images selected to generate composite images of a plurality of patterns selected from among predefined patterns; and performing control, using a display controller, such that one composite image selected from among the composite images of the plurality of patterns is displayed on an image monitor and, based on an instruction input by way of an instruction input unit, the one composite image displayed on the image monitor is replaced with one composite image designated by the instruction from among the composite images of the plurality of patterns to display the one composite image designated on the image monitor.

Also, the present invention provides a non-transitory computer readable recording medium storing a program for causing a computer to execute each of the steps of the image processing method according to above.

According to the present invention, composite images of a plurality of patterns are automatically generated from a plurality of images owned by the user and one of the composite images is displayed on an image monitor as an initial image, thereby making it possible to propose a composite image corresponding to the preference of the user.

Furthermore, by sequentially inputting instructions to designate one desired composite image from among the composite images of the plurality of patterns by way of an instruction input unit, the user can sequentially switch the composite images of the plurality of patterns to display the composite images on the image monitor for viewing.

DETAILED DESCRIPTION OF THE INVENTION

Hereinafter, the image processing apparatus, the image processing method, and the recording medium of the present invention will be described in detail based on a preferred embodiment depicted in the accompanying drawings.

Figure 1:
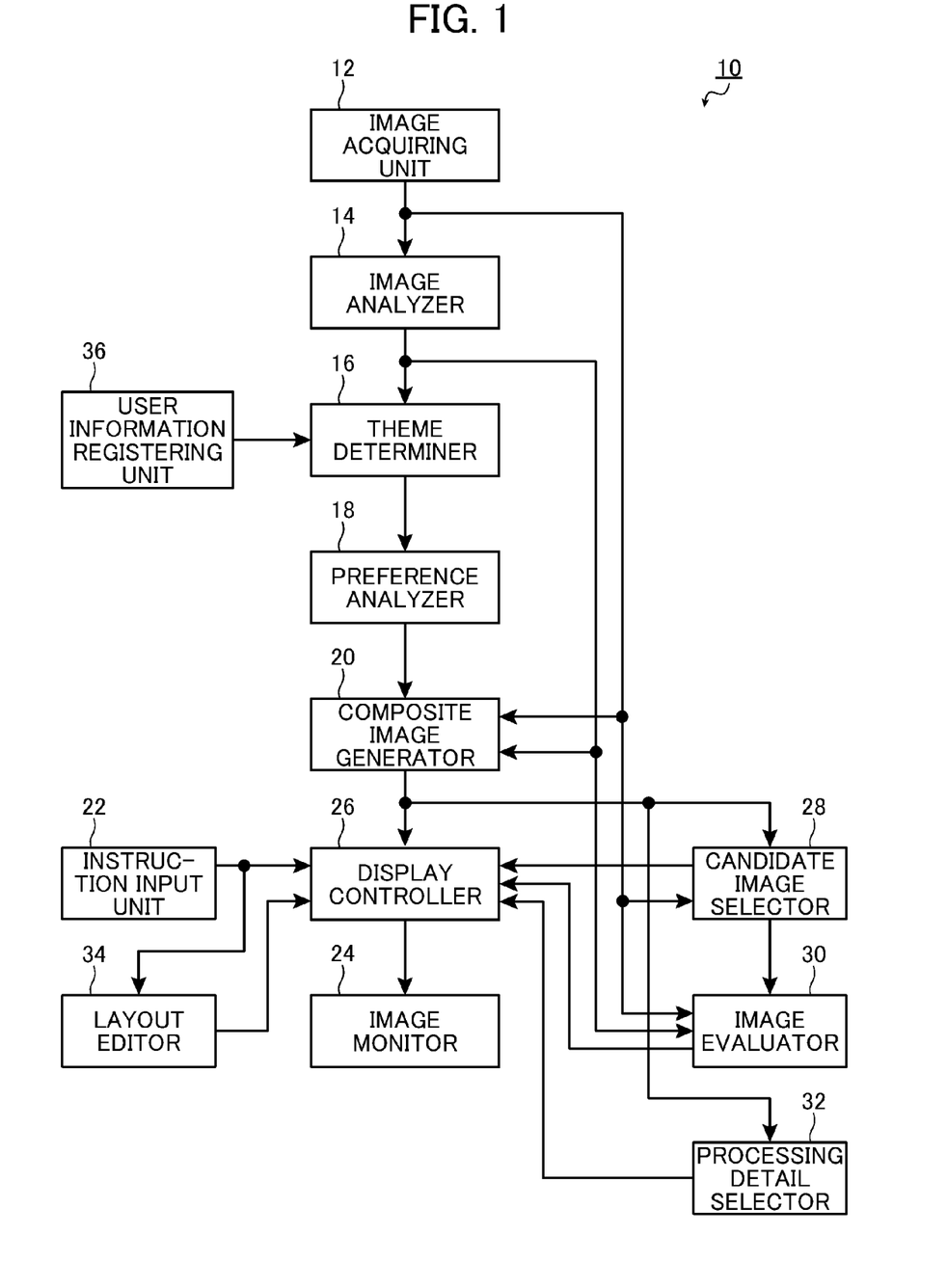
FIG. 1 is a block diagram of an embodiment illustrating the configuration of the image processing apparatus of the present invention.

FIG. 1 is a block diagram of an embodiment illustrating the configuration of the image processing apparatus of the present invention. An image processing apparatus 10 depicted in FIG. 1 generates composite images of a plurality of patterns from an image group having a plurality of images owned by a user and displays the generated composite images of the plurality of patterns to propose the images to the user.

The image processing apparatus 10 is provided with an image acquiring unit 12, an image analyzer 14, a theme determiner 16, a preference analyzer 18, a composite image generator 20, an instruction input unit 22, an image monitor 24, a display controller 26, a candidate image selector 28, an image evaluator 30, a processing detail selector 32, a layout editor 34, and a user information registering unit 36.

The image acquiring unit 12 acquires an image group having a plurality of images owned by the user.

The image processing apparatus 10 may be provided with an image storage that stores (saves) the image group acquired by the image acquiring unit 12.

The image analyzer 14 performs image analysis on each of the plurality of images acquired by the image acquiring unit 12 and outputs image analysis information.

The image analysis corresponds to processing for analyzing image content (image feature), and face detection, face recognition, blurring, brightness, similarity analysis, image grouping based on a photographing time or GPS information (position information), image recognition (subject discrimination), scene recognition (night views, the ocean, autumn leaves, sandy beaches, the sky . . . ), object recognition (the Temple of the Golden Pavilion, the Statue of Liberty, dishes, flowers, cakes ... ), or the like can be used. Furthermore, the image analysis includes processing for analyzing ancillary information (tag information) of an image such as an exchangeable image file format (Exif). The image analyzer 14 is capable of performing at least one of the analysis of image content and the analysis of ancillary information as the image analysis. With regard to an image that does not have ancillary information among the plurality of images, the image analyzer 14 performs only the image analysis of image content and does not perform (cannot perform) the image analysis of ancillary information.

It should be noted that the image analysis method is not in any way restricted and various image analysis methods can be used including conventionally known image analysis methods.

Instead of performing the image analysis on each of the plurality of images within the image processing apparatus 10 and outputting the image analysis information as described above, a configuration may be employed in which an image analysis information acquiring unit is provided instead of the image analyzer 14 and the image analysis information acquiring unit acquires image analysis information on each of a plurality of images which is input from the outside of the image processing apparatus 10. In this case, the image analysis information may be associated with each corresponding image. Thus, the image analysis information may be added to each corresponding image, or may be kept independent from each corresponding image.

Alternatively, similar to the image analyzer 14, the image analysis information acquiring unit may be configured to perform the image analysis on each of the plurality of images and to output the image analysis information on each of the plurality of images.

The theme determiner 16 determines the theme of an image group from among predefined themes based on the image analysis information on each of the plurality of images output from the image analyzer 14.

The theme of an image group is a keyword representing an atmosphere or impression that the user feels when viewing the image group. Children, travel, wedding ceremony, birthday, sports meet, and the like are predefined.

For example, as shown in Table 1, when the proportion of "children" being photographed is high in an image group, the theme of the image group can be determined as children.

When the photographing period of an image group is from one to several days, images such as "scenery" and "dish" are mixed, and the photographing locations are scattered (using GPS information), the theme of the image group can be determined as travel.

When the photographing period of an image group is from one to two hours, images such as "ring" and "cake" are mixed, and the photographing location is fixed (using GPS information), the theme of the image group can be determined as a wedding ceremony. With similar image features, when images such as "children" and "candle" are mixed, the theme of the image group can be determined as a birthday, and when images such as "children" and "sports field" are mixed, the theme of the image group can be determined as a sports meet.

In cases other than the aforementioned cases, the theme of an image group can also be determined in the same manner.

It should be noted that the method for determining the theme of an image group is not in any way restricted and various determination methods can be used including conventionally known determination methods.

TABLE 1

| Image feature examples | Theme determination | User preference analysis |
|---|---|---|
| Proportion of "children" being photographed is high | Children | Children image given maximum priority + parent image given priority Priority of non-person image is low |
| Photographing period of image group is from one to several days Images such as "scenery" and "dish" are mixed Photographing locations are scattered (using GPS information) | Travel | Person image + scenery image are important |
| Photographing period of image group is from one to two hours Images such as "ring" and "cake" are mixed | Wedding ceremony | Prioritize couple image of "married couple" Images such as "ring" and "cake" are also important |
| Images such as "children" and "candle" are mixed | Birthday | |
| Images such as "children" and "sports field" are mixed . . . | Sports meet . . . | |
| Photographing location is fixed (using GPS information) | | |

The preference analyzer 18 analyzes the preference of the user who is the owner of the image group from among predefined preferences based on the theme of the image group determined by the theme determiner 16.

Prioritizing a children image, prioritizing a parent image, prioritizing a children image and parent image, prioritizing a person image, prioritizing a scenery image, prioritizing a person image and scenery image, prioritizing a married couple image, prioritizing groups of people, and the like are predefined as preferences.

As shown in the aforementioned Table 1, when the theme of an image group is children, the preference analyzer 18 analyzes that, as the preference of the user, maximum priority is to be given to an image in which children are photographed (children image) and priority is to be given to an image in which the parents of the children are photographed (parent image). By contrast, the preference analyzer 18 analyzes that the priority of a non-person image is low.

When the theme of an image group is travel, the preference analyzer 18 analyzes that an image in which a person is photographed (person image) and an image in which scenery is photographed (scenery image) are important (high priority).

When the theme of an image group is a wedding ceremony, the preference analyzer 18 analyzes that priority is to be given to an image (couple image) in which the two people of a "married couple" are photographed.

The preference of the user can also be analyzed in a similar manner when the theme of an image group is a birthday, a sports meet, or the like.

It should be noted that the method for analyzing the preference of the user is not in any way restricted and various analysis methods can be used including conventionally known analysis methods.

From among the plurality of images and based on the image analysis information, the composite image generator 20 selects a certain number of images corresponding to the preference of the user analyzed by the preference analyzer 18 and uses the selected certain number of images corresponding to the preference of the user to generate composite images of a plurality of patterns that are selected from among predefined patterns.

For example, when the preference of the user is children, the composite image generator 20 selects a certain number of images in which children are photographed from among the plurality of images based on the image analysis information and uses the certain number of images in which the children are photographed to generate composite images of a plurality of patterns.

A children image prioritizing pattern, a parent image prioritizing pattern, a children image and parent image prioritizing pattern, a scenery image prioritizing pattern, a married-couple image prioritizing pattern, and the like are predefined as patterns as well as a pattern in which priority is given to a person image of a person who appears many times among a plurality of images based on a person recognition result (for example, an image of a close friend is prioritized and selected), a person image and scenery image prioritizing pattern (a person image and scenery image are mixed at a fixed ratio and selected), and a people group prioritizing pattern (an image that includes many people is prioritized and selected based on each photographing date such that as many people as possible are used).

The instruction input unit 22 receives an instruction input by the user, and a mouse, a touch panel, a keyboard and the like can be given as examples thereof.

The instruction that is input by way of the instruction input unit 22 include an instruction to designate one composite image from among composite images of a plurality of patterns generated by the composite image generator 20, an instruction to display, on the image monitor 24, a plurality of candidate images selected by the candidate image selector 28 described below, an instruction to designate the type of editing processing performed by the layout editor 34 described below, and the like.

The image monitor 24 displays various images, and a liquid crystal display and the like can be given as examples thereof.

The image monitor 24 is capable of displaying a display picture of composite image, a display picture of candidate image which includes a candidate image used in the editing of the layout of a composite image, a display picture having a processing detail of editing processing for a composite image displayed thereon, and the like.

The display controller 26 performs control such that one composite image selected from among composite images of a plurality of patterns is displayed on the image monitor 24 as an initial image, and, based on an instruction input by way of the instruction input unit 22, the composite image displayed on the image monitor 24 is replaced with one composite image designated by the instruction from among the composite images of the plurality of patterns and the designated composite image is displayed on the image monitor 24.

Furthermore, the display controller 26 performs control such that the display picture of candidate image, the display picture having a processing detail of editing processing displayed thereon, and the like described above are displayed on the image monitor 24.

The candidate image selector 28 selects a plurality of candidate images including an image or images being used in the composite image displayed on the image monitor 24, from among a plurality of images, as images to be used in the editing of the layout of the composite image displayed on the image monitor 24.

A candidate image is an image that can be used to replace an image being used in a composite image in order to edit the layout of the composite image displayed on the image monitor 24.

One or more images selected from among a plurality of images can be included in the candidate images besides the image or the images being used in the composite image displayed on the image monitor 24. In this case, for example, it is desirable that one or more images that correspond to the pattern of the composite image displayed on the image monitor 24 be included so as to correspond to the characteristics of the images being used in the composite image.

The image evaluator 30 calculates an evaluation value for each of the plurality of candidate images selected by the candidate image selector 28, based on the image analysis information.

The image evaluator 30 performs evaluation such that, for example, the evaluation value of a candidate image having image content that corresponds to the pattern of the composite image displayed on the image monitor 24 is greater than the evaluation value of a candidate image having image content that does not correspond to the pattern of the composite image displayed on the image monitor 24. For example, when the composite image corresponds to the person image prioritizing pattern, the evaluation value of a person image is made greater than the evaluation values of other images.

As the evaluation value, for example, an integrated evaluation value calculated from one piece of image analysis information corresponding to a plurality of analysis methods or a combination of two or more pieces of the image analysis information. Furthermore, when the integrated evaluation value is calculated, image analysis information corresponding to two or more analysis methods may be weighted.

It should be noted that the method for calculating an evaluation value for a candidate image is not in any way restricted and various calculation methods can be used including conventionally known calculation methods.

With regard to a plurality of types of editing processing performed in the editing of the layout, the processing detail selector 32 selects a processing detail that corresponds to the pattern of the composite image displayed on the image monitor 24 from among a plurality of processing details included in each type of editing processing.

The editing processing includes insertion of a clip art image into a composite image, change of the template being used by a composite image, and various image correction processing for the image being used in a composite image (correction of brightness, hue, and the like).

Furthermore, the processing detail included in the editing processing corresponds to a processing detail that can be performed in each editing processing, The processing detail corresponds to: the types of clip art images that can be inserted when inserting a clip art image; the types of templates that can be changed when changing a template; and the types of image correction processing that can be performed when performing image correction processing.

For example, when the pattern of a composite image is the children image prioritizing pattern, a clip art image corresponding to children is selected from among a variety of clip art images.

The layout editor 34 edits the layout of the composite image displayed on the image monitor 24, based on an instruction input by way of the instruction input unit 22.

The layout editor 34 is capable of using at least either of: a plurality of candidate images displayed on the image monitor 24; and the processing detail of editing processing displayed on the image monitor 24 to edit the layout of the composite image displayed on the image monitor 24.

In other words, the layout editor 34 is capable of replacing an image being used in the composite image with a candidate image and performing various editing processing on the composite image to insert an clip art image, to change the template, and to perform various image processing, for example.

The user information registering unit 36 registers user information on a user.

The user information includes the age, gender, address, nationality and the like of the user, for example.

Next, the operation of the image processing apparatus 10 will be described with reference to the flowcharts illustrated in FIGS. 2 to 4.

Figure 2:
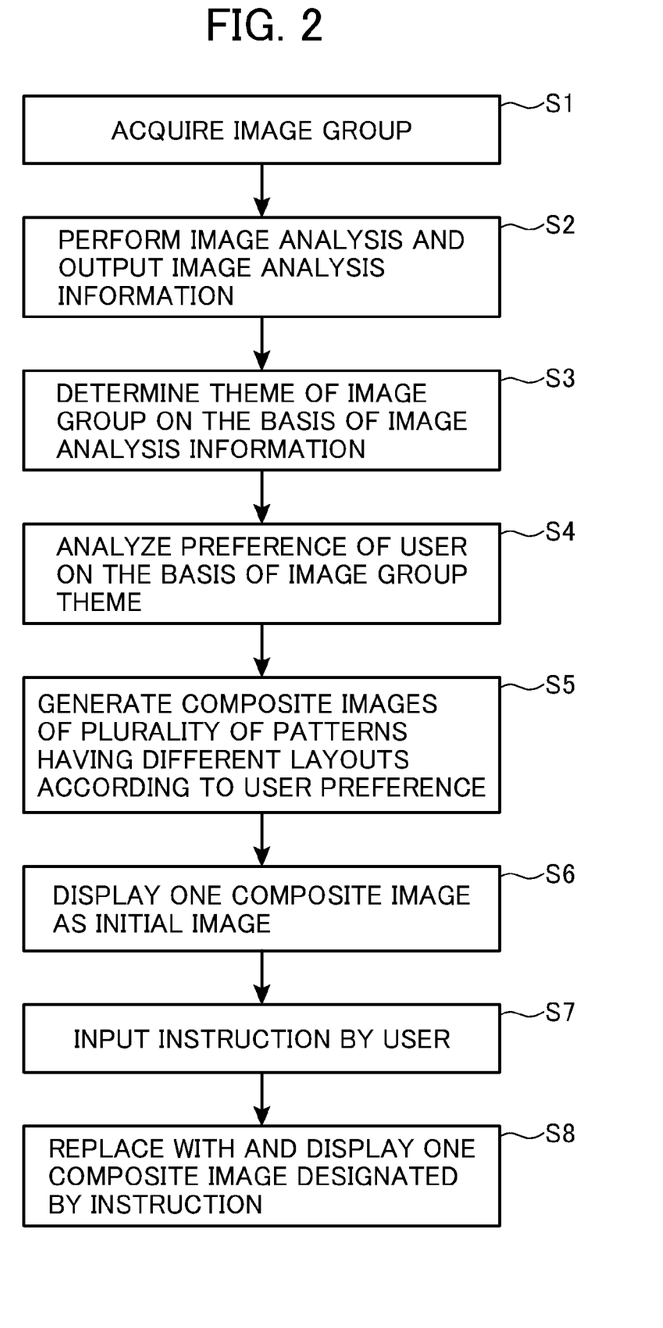
FIG. 2 is a flowchart showing an example of the operation of the image processing apparatus depicted in FIG. 1.

In the image processing apparatus 10, first, the image acquiring unit 12 acquires an image group having a plurality of images owned by the user (step S1 of FIG. 2).

Next, the image analyzer 14 performs image analysis on each of the plurality of images acquired by the image acquiring unit 12 to output image analysis information (step S2 of FIG. 2).

Next, theme determiner 16 determines the theme of the image group from among predefined themes based on the image analysis information of each of the plurality of images (step S3 of FIG. 2).

Next, the preference analyzer 18 analyzes a preference of the user who is the owner of the image group from among predefined preferences based on the theme of the image group determined by the theme determiner 16 (step S4 of FIG. 2).

Next, the composite image generator 20 selects a certain number of images corresponding to the preference of the user analyzed by the preference analyzer 18 from among the plurality of images based on the image analysis information and uses the selected certain number of images corresponding to the preference of the user to generate composite images of a plurality of patterns selected from among predefined patterns (step S5 of FIG. 2).

In the present embodiment, composite images of four patterns including the children image prioritizing pattern, the children image and parent image prioritizing pattern, the person image and scenery image prioritizing pattern, and the people group prioritizing pattern are generated.

Here, the theme determiner 16 may determine two or more different themes from the image group.

In this case, the composite image generator 20 can generate a composite image of a pattern corresponding to each of the two or more different themes. Furthermore, the composite image generator 20 may generate composite images of two or more patterns for one theme.

For example, it is assumed that the theme of the image group is determined by the theme determiner 16 as being the two themes of "children" and "travel". In this case, for example, the preference analyzer 18 analyzes that a children image, and a children image and parent image are prioritized according to the preference of the user with regard to the theme of "children". Furthermore, the preference analyzer 18 analyzes that a person and scenery image is prioritized with regard to the theme of "travel". In response to this, in the composite image generator 20, composite images of three patterns including the children image prioritizing pattern, the children image and parent image prioritizing pattern, and the person image and scenery image prioritizing pattern are generated.

Furthermore, the theme determiner 16 may determine the theme of an image group based on user information in addition to the image analysis information.

For example, using the GPS information of each of a plurality of images as user information when there are many images that have been photographed in a location away from the home among the plurality of images enables the theme determiner 16 to determine that the theme of the image group is "travel".

Here, the display region of the image monitor 24 is limited. Therefore, too many composite images causes the user to become confused when designating one composite image from among composite images of a plurality of patterns. It is therefore desirable that the composite image generator 20 sets the upper limit of the number of composite images to be generated and generates a certain number of composite images.

Furthermore, when the difference between the composite images of the plurality of patterns is small, this also causes the user to become confused. It is therefore desirable that composite images having large differences be generated. For example, in the cases of the children image prioritizing pattern and the children image and parent image prioritizing pattern, the difference between these patterns become smaller as the number of images in which children and parents are photographed together increases.

Here, the difference between composite images of a plurality of patterns can be indicated by the degree of coincidence between the images included in each of the composite images of the plurality of patterns. For example, if eight images are the same among ten images that are used in each of the composite images of two patterns, the difference between the two composite images is considered to be small. Conversely, if only two images are the same among the ten images, the difference between the two composite images is considered to be large.

Consequently, the composite image generator 20 generates candidate composite images of a plurality of patterns that are candidates for composite images, and outputs, as composite images, a certain number of candidate composite images selected from among the candidate composite images of the plurality of patterns. Then, if the degree of coincidence between the images included in the candidate composite images of any two patterns among the candidate composite images of the plurality of patterns is equal to or greater than a threshold value, it is desirable that one of the candidate composite images of the two patterns in which the degree of coincidence is equal to or greater than the threshold value be output as a composite image and the other not be output as a composite image.

For example, the degree of coincidence between a candidate composite image of the children image prioritizing pattern and a candidate composite image of the person image and scenery image prioritizing pattern is small, and therefore both are output as composite images.

Figure 5:
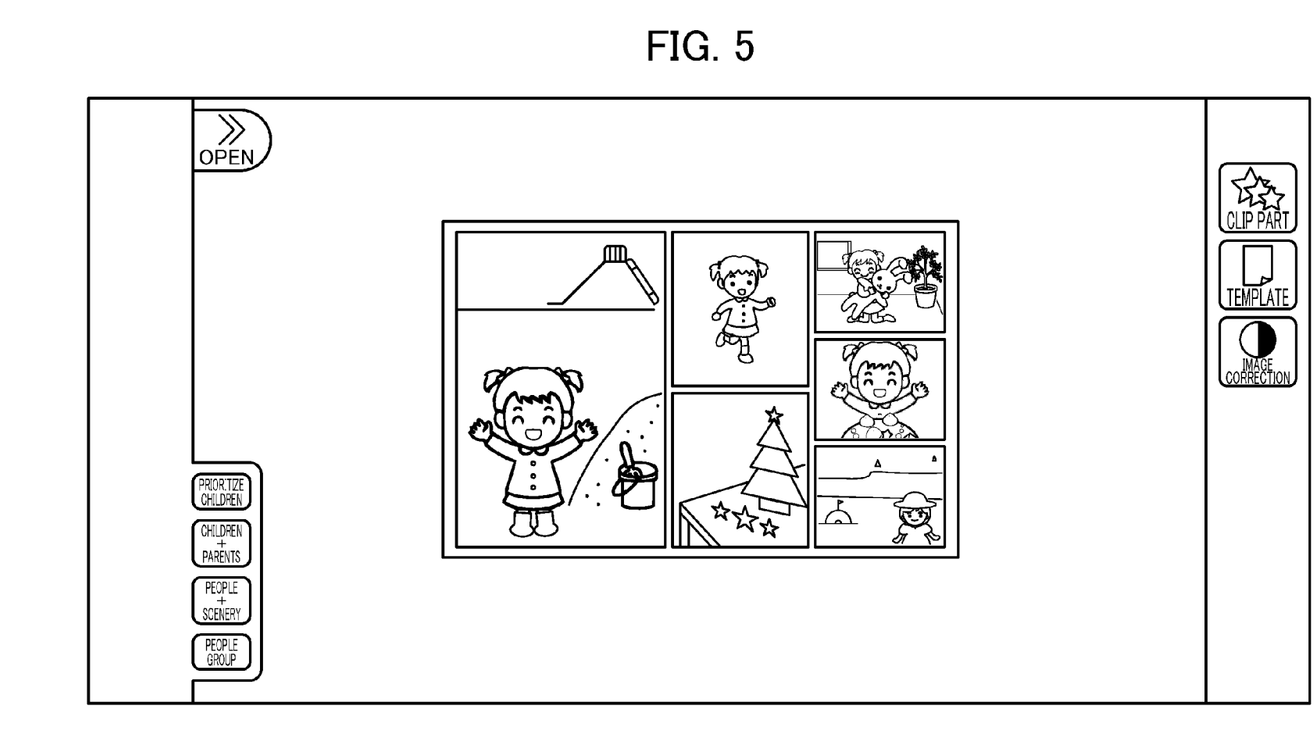
FIG. 5 is a conceptual diagram illustrating an example of a display picture of composite image displayed on an image monitor.

Next, as depicted in FIG. 5, the display controller 26 performs control such that one composite image selected from among the composite images of the plurality of patterns, which is a composite image of the children image prioritizing pattern in the present embodiment, is displayed on the image monitor 24 as an initial image (step S6 of FIG. 2).

Accordingly, the image processing apparatus 10 is capable of automatically generating composite images of a plurality of patterns from a plurality of images owned by the user and displaying one of the composite images on the image monitor 24 as an initial image to propose a composite image that corresponds to the preference of the user. By contrast, the user can view the composite image that is proposed as a result of being automatically generated by the image processing apparatus 10 and displayed on the image monitor 24.

FIG. 5 is a conceptual diagram illustrating an example of a display picture of composite image displayed on the image monitor. In FIG. 5, the composite image is displayed in the center section of the display picture.

An "open" button for displaying the display picture of candidate image is displayed in the upper left section of a display picture of composite image, and a plurality of switching buttons for switching the composite images are displayed in the lower left section.

The plurality of switching buttons correspond to the respective composite images of the plurality of patterns. In the present embodiment, four switching buttons corresponding to the respective children image prioritizing pattern, children image and parent image prioritizing pattern, person image and scenery image prioritizing pattern, and people group prioritizing pattern are displayed. It should be noted that the arrangement of the plurality of switching buttons may be changed according to the priorities of the composite images of the plurality of patterns and then the switching buttons of which arrangement has been changed may be displayed. For example, the composite images can be displayed such that the composite image having the highest priority is displayed at the top and the other composite images having lower priorities are displayed being sequentially arranged toward the lower side in descending order of priority.

A plurality of edit buttons for displaying the display picture having the processing detail of editing processing displayed thereon are displayed in the right section of the display picture. In the present embodiment, three edit buttons corresponding to the respective insertion of a clip art image, change of a template, and image correction processing are displayed.

Next, for example, an instruction to designate one composite image from among the composite images of the plurality of patterns is input by way of the instruction input unit 22 (step S7 of FIG. 2). For example, one switching button among the four switching buttons depicted in the lower left section of FIG. 5 is pressed (the switching button is clicked when the instruction input unit 22 is a mouse, and the switching button is touched when the instruction input unit 22 is a touch panel).

Next, the display controller 26 performs control such that, based on the instruction input by way of the instruction input unit 22, the composite image displayed on the image monitor 24 is replaced with one composite image which is selected from among the composite images of the plurality of patterns and is corresponding to one switching button designated by the instruction from among the plurality of switching buttons in the present embodiment, and the designated composite image is displayed on the image monitor 24 (step S8 of FIG. 2).

In other words, by sequentially inputting instructions to designate one desired composite image from among the composite images of the plurality of patterns by way of the instruction input unit 22, the user can sequentially switch the composite images of the plurality of patterns to display the composite images on the image monitor 24 for viewing.

Figure 3:
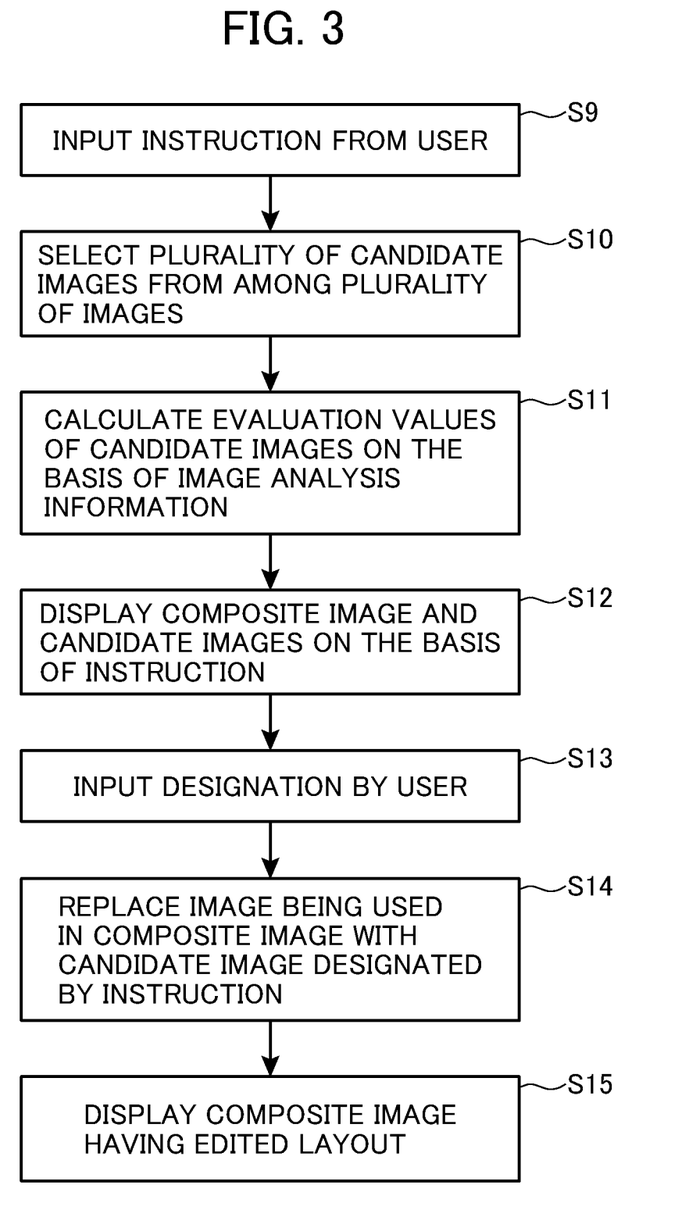
FIG. 3 is a flowchart showing an example of the operation of the image processing apparatus depicted in FIG. 1.

Here, for example, an instruction to display the display picture of candidate image is input by way of the instruction input unit 22 (step S9 of FIG. 3). For example, the "open" button depicted in the upper left section of FIG. 5 is pressed.

In this case, the candidate image selector 28 selects a plurality of candidate images including an image being used in the composite image displayed on the image monitor 24 from among a plurality of images, as images to be used in the editing of the layout of the composite image displayed on the image monitor 24 (step S10 of FIG. 3).

Furthermore, the image evaluator 30 calculates an evaluation value for each of the plurality of candidate images selected by the candidate image selector 28 based on the image analysis information (step S11 of FIG. 3).

Figure 6:
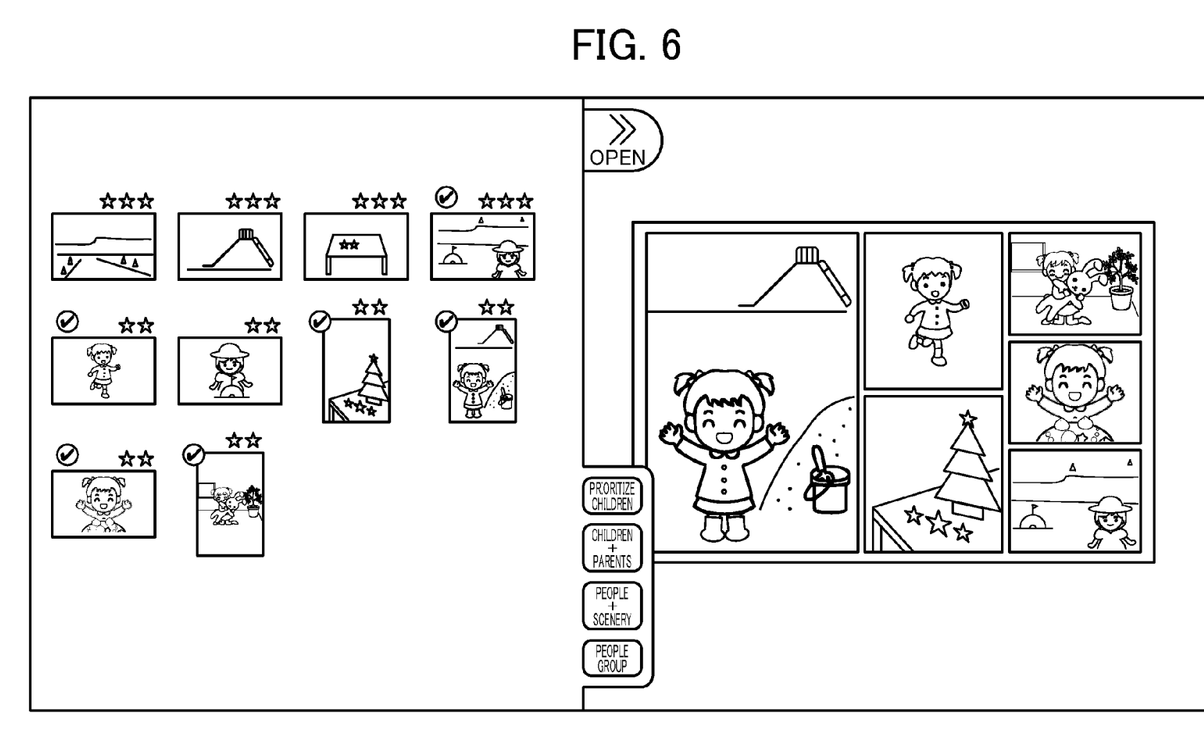
FIG. 6 is a conceptual diagram illustrating an example of a display picture of candidate image displayed on the image monitor.

Next, as depicted in FIG. 6, the display controller 26 performs control such that, based on the instruction input by way of the instruction input unit 22, the plurality of candidate images selected by the candidate image selector 28 are displayed on the image monitor 24 together with the composite image displayed on the image monitor 24 (step S12 of FIG. 3).

The user can thereby view the plurality of candidate images for editing the layout of the composite image displayed on the image monitor 24.

Furthermore, the display controller 26 performs control such that a check mark is displayed for each of the images used in the composite image displayed on the image monitor 24, among the plurality of candidate images displayed on the image monitor 24.

It should be noted that the present invention is not restricted to the check mark and any kind of mark may be displayed as long as the mark can indicate that an image is being used in the composite image displayed on the image monitor 24.

The user can thereby understand at a glance the images being used in the composite image displayed on the image monitor 24, among the plurality of candidate images.

Furthermore, the display controller 26 performs control such that a star mark indicating an evaluation value calculated by the image evaluator 30 is displayed for each of the plurality of candidate images displayed on the image monitor 24. The number of star marks indicates the degree of recommendation (evaluation value) for the plurality of candidate images.

It should be noted that the present invention is not restricted to the star mark and any kind of mark may be displayed as long as the mark indicates an evaluation value for each of the plurality of candidate images.

The user can thereby understand at a glance the candidate images recommended by the image processing apparatus 10 among the plurality of candidate images.

FIG. 6 is a conceptual diagram illustrating an example of a display picture of candidate image displayed on the image monitor. In FIG. 6, the composite image is moved from the center section of the display picture depicted in FIG. 5 and displayed in the right section of the display picture, and the candidate images are pulled out from the left section and displayed in the left section of the display picture.

In place of the "open" button, a "close" button for hiding the display picture of candidate image is displayed in the upper right section of the display picture of candidate image, and four switching buttons that are the same as those depicted in FIG. 5 are displayed in the lower right section.

A plurality of candidate images are displayed within the display picture of candidate image. As described above, the check marks are displayed on the images being used in the composite image displayed on the image monitor 24, among the plurality of candidate images. Furthermore, the star mark is displayed on each of the plurality of candidate images.

A certain number of candidate images can be displayed in the display picture of candidate image. When all of the candidate images cannot be displayed, using a scrollbar provided in the right section of the display picture of candidate image can switch a candidate image to be displayed.

It should be noted that, when the composite image displayed on the image monitor 24 is replaced with a different composite image, a candidate image corresponding to the pattern of the replacing composite image is reselected and the candidate image displayed on the image monitor 24 is changed accordingly.

Next, for example, an instruction to replace the image used in the composite image displayed on the image monitor 24 with a candidate image is input by way of the instruction input unit 22 by the user (step S13 of FIG. 3).

In this case, the layout editor 34 edits, based on the instruction input by way of the instruction input unit 22, the layout of the composite image displayed on the image monitor 24 such that an image being used in the composite image displayed on the image monitor 24 is replaced with a candidate image designated by the instruction (step S14 of FIG. 3).

Furthermore, the display controller 26 performs control such that the composite image in which the layout has been edited by the layout editor 34 is displayed on the image monitor 24 (step S15 of FIG. 3).

The user can thereby edit the layout of the composite image displayed on the image monitor 24 such that an image being used in the composite image displayed on the image monitor 24 is replaced with a candidate image.

Figure 4:
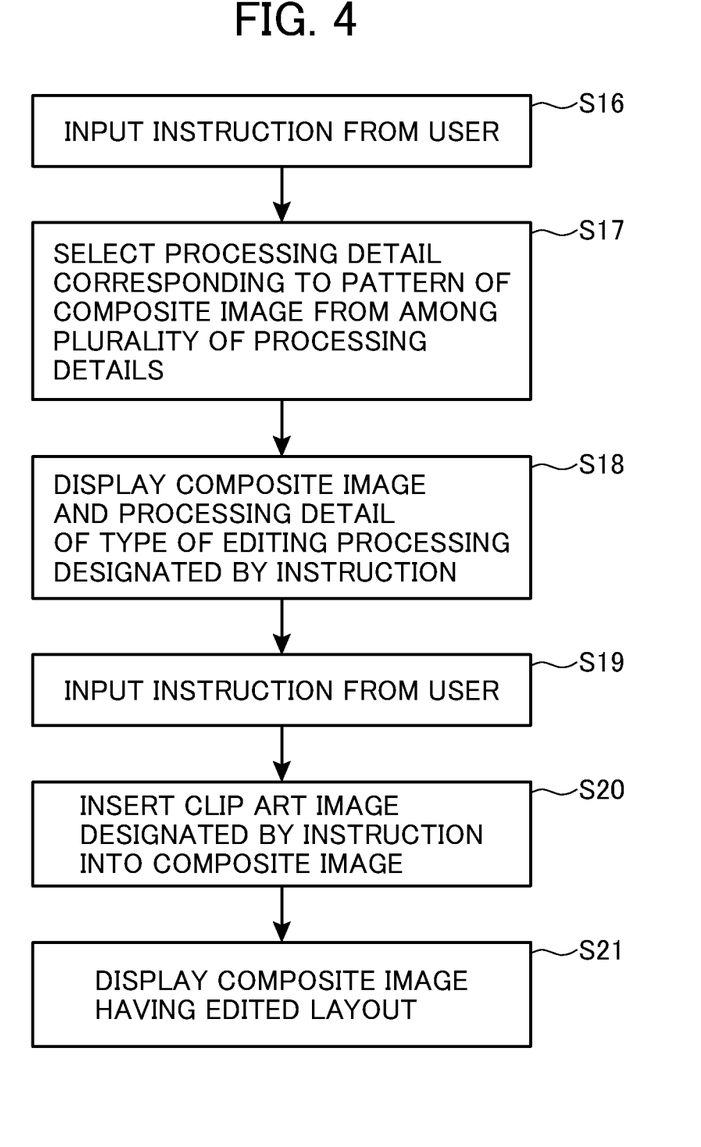
FIG. 4 is a flowchart showing an example of the operation of the image processing apparatus depicted in FIG. 1.

Furthermore, for example, an instruction to display the display picture having the processing detail of editing processing displayed thereon is input by way of the instruction input unit 22 (step S16 of FIG. 4). For example, an edit button that is depicted in the right section of FIG. 5 and corresponds to the insertion of a clip art image is pressed.

In this case, with regard to a plurality of types of editing processing performed in the layout editing, the processing detail selector 32 selects a processing detail that corresponds to the pattern of the composite image displayed on the image monitor 24 from among a plurality of processing details included in each type of editing processing (step S17 of FIG. 4).

For example, when the editing processing is the insertion of a clip art image and the pattern of the composite image is the children image prioritizing pattern, a clip art image corresponding to children is selected from among various clip art images as a processing detail.

Figure 7:
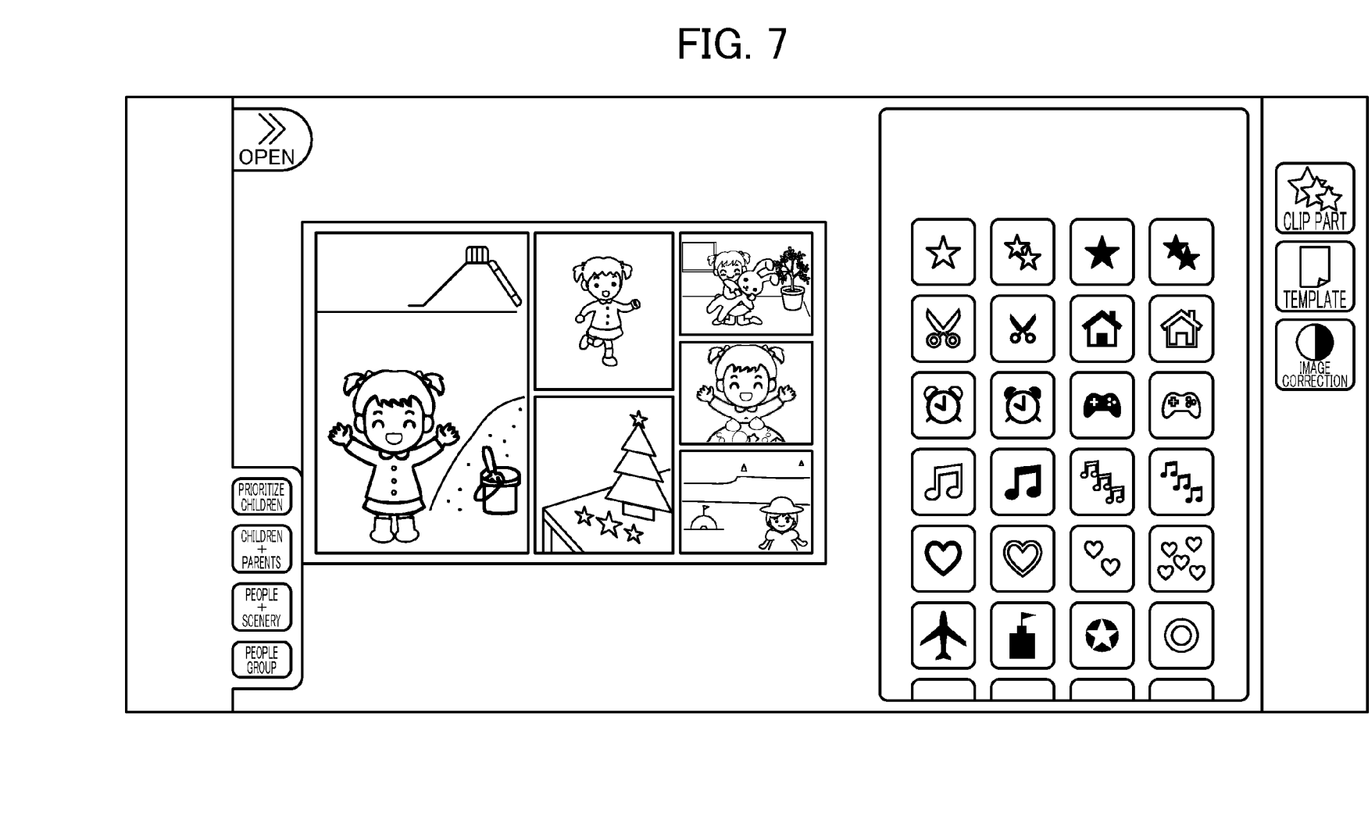
FIG. 7 is a conceptual diagram illustrating an example of a display picture having processing details of editing processing displayed on the image monitor.

Next, as depicted in FIG. 7, the display controller 26 performs control such that, based on the instruction input by way of the instruction input unit 22, the processing detail selected by the processing detail selector 32 is displayed on the image monitor 24 as the processing detail of the type of editing processing designated by the instruction, together with the composite image displayed on the image monitor 24 (step S18 of FIG. 4).

As described above, when the editing processing is the insertion of a clip art image and the pattern of the composite image is the children image prioritizing pattern, a clip art image corresponding to children is displayed on the image monitor 24 as a processing detail.

The user can thereby view the processing detail of editing processing for editing the layout of the composite image displayed on the image monitor 24.

FIG. 7 is a conceptual diagram illustrating an example of a display picture having processing details of editing processing displayed on the image monitor. In FIG. 7, the composite image is moved from the center section of the display picture depicted in FIG. 5 and displayed in the left section of the display picture, and the processing details of editing processing are displayed in the right section of the display picture.

In the present embodiment, a plurality of clip art images corresponding to children are displayed within the display picture of the processing details of the editing processing.

It should be noted that, when the composite image displayed on the image monitor 24 is replaced with a different composite image, the processing detail of the editing processing corresponding to the pattern of the replacing composite image is reselected and the processing detail to be displayed on the image monitor 24 is changed accordingly.

Here, for example, an instruction to insert a clip art image selected from among the clip art images displayed on the image monitor 24 into a designated position in the composite image displayed on the image monitor 24 is input by way of the instruction input unit 22 by the user (step S19 of FIG. 4).

In this case, the layout editor 34 edits the layout of the composite image displayed on the image monitor 24 based on the instruction input by way of the instruction input unit 22 such that the clip art image designated by the instruction is inserted into the designated position in the composite image displayed on the image monitor 24 (step S20 of FIG. 4).

Furthermore, the display controller 26 performs control such that the composite image in which the layout has been edited by the layout editor 34 is displayed on the image monitor 24 (step S21 of FIG. 4).

The user can thereby edit the layout of the composite image displayed on the image monitor 24 such that clip art image is inserted into the composite image displayed on the image monitor 24.

The device of the present invention may be configured such that each of the constituent elements provided therein is constituted of dedicated hardware or a programmed computer.

The method of the present invention can be implemented by a program for causing a computer to execute each of the steps of the method, for example. Furthermore, a computer-readable recording medium having this program recorded therein can also be provided.

The present invention is basically as described above.

Heretofore, a detailed description has been given of the present invention; however, the present invention is not restricted to the aforementioned embodiment, and various improvements or modifications may be made without deviating from the gist of the present invention.

What is claimed is:

1. An image processing apparatus comprising:
   an image acquiring unit that acquires an image group having a plurality of images owned by a user;
   an image analysis information acquiring unit that acquires image analysis information of each of the plurality of images;
   a theme determiner that determines a theme of the image group from among predefined themes based on the image analysis information;
   a preference analyzer that analyzes a preference of the user from among predefined preferences based on the theme of the image group;
   a composite image generator that selects a certain number of images corresponding to the preference of the user from among the plurality of images based on the image analysis information and uses the certain number of images selected to generate composite images of a plurality of patterns selected from among predefined patterns;
   an instruction input unit that receives an instruction input by the user;
   an image monitor that displays an image; and
   a display controller that performs control such that one composite image selected from among the composite images of the plurality of patterns is displayed on the image monitor and, based on an instruction input by way of the instruction input unit, the one composite image displayed on the image monitor is replaced with one composite image designated by the instruction from among the composite images of the plurality of patterns to display the one composite image designated on the image monitor.

2. The image processing apparatus according to claim 1, wherein the display controller performs control such that a plurality of buttons corresponding to the respective composite images of the plurality of patterns are displayed on the image monitor together with the one composite image displayed on the image monitor and, based on an instruction input by way of the instruction input unit, the one composite image displayed on the image monitor is replaced with one composite image which is selected from among the composite images of the plurality of patterns and is corresponding to one button designated by the instruction from among the plurality of buttons to display the one composite image selected on the image monitor.

3. The image processing apparatus according to claim 2, wherein the display controller changes an arrangement of the plurality of buttons according to priorities of the composite images of the plurality of patterns and displays the plurality of buttons of which arrangement has been changed.

4. The image processing apparatus according to claim 1, further comprising:
   a candidate image selector that selects, from among the plurality of images, a plurality of candidate images including an image or images being used in the one composite image displayed on the image monitor, as images to be used in editing a layout of the one composite image displayed on the image monitor,
   wherein the display controller performs control such that the plurality of candidate images selected by the candidate image selector are displayed on the image monitor together with the one composite image displayed on the image monitor, based on an instruction input by way of the instruction input unit.

5. The image processing apparatus according to claim 4, wherein, in addition to the image or images being used in the one composite image displayed on the image monitor, the candidate image selector selects, from among the plurality of images, a plurality of candidate images including one or more images that correspond to a pattern of the one composite image displayed on the image monitor, as images to be used in editing the layout.

6. The image processing apparatus according to claim 4, wherein the display controller performs control such that a mark indicating that an image is being used in the one composite image displayed on the image monitor is displayed with respect to each of the images being used in the one composite image displayed on the image monitor among the plurality of candidate images displayed on the image monitor.

7. The image processing apparatus according to claim 4, further comprising:
an image evaluator that calculates an evaluation value for each of the plurality of candidate images based on the image analysis information,
wherein the image evaluator performs evaluation such that an evaluation value of a candidate image having image content that corresponds to a pattern of the one composite image displayed on the image monitor is greater than an evaluation value of a candidate image having image content that does not correspond to the pattern of the one composite image displayed on the image monitor, and
wherein the display controller performs control such that a mark indicating the evaluation value is displayed with respect to each of the plurality of candidate images displayed on the image monitor.

8. The image processing apparatus according to claim 4, further comprising:
a processing detail selector that selects a processing detail that corresponds to a pattern of the one composite image displayed on the image monitor from among a plurality of processing details included in each of a plurality of types of editing processing performed in editing the layout,
wherein the display controller performs control such that, based on an instruction input by way of the instruction input unit, the processing detail selected by the processing detail selector is displayed on the image monitor as a processing detail of a type of editing processing designated by the instruction, together with the one composite image displayed on the image monitor.

9. The image processing apparatus according to claim 8, further comprising:
a layout editor that edits the layout of the one composite image displayed on the image monitor based on an instruction input by way of the instruction input unit,
wherein the layout editor uses at least either of the plurality of candidate images displayed on the image monitor and the processing detail of the editing processing displayed on the image monitor to edit the layout of the one composite image displayed on the image monitor.

10. The image processing apparatus according to claim 1, wherein the theme determiner determines two or more different themes from the image group, and
wherein the composite image generator generates a composite image of a pattern that corresponds to each of the two or more different themes.

11. The image processing apparatus according to claim 1, wherein the composite image generator generates composite images of two or more patterns for the one theme.

12. The image processing apparatus according to claim 1, further comprising:
a user information registering unit that registers user information on the user,
wherein the theme determiner determines the theme of the image group based on the user information in addition to the image analysis information.

13. The image processing apparatus according to claim 1, wherein the composite image generator generates a certain number of composite images.

14. The image processing apparatus according to claim 13, wherein the composite image generator generates candidate composite images of a plurality of patterns that are candidates for the composite images and outputs, as the composite images, a certain number of candidate composite images selected from among the candidate composite images of the plurality of patterns, and, when a degree of coincidence between images included in candidate composite images of any two patterns among the candidate composite images of the plurality of patterns is equal to or greater than a threshold value, the composite image generator outputs, as the composite image, one of the candidate composite images of the two patterns having the degree of coincidence equal to or greater than the threshold value and does not output another as the composite image.

15. The image processing apparatus according to claim 1, wherein the image analysis information acquiring unit performs image analysis on each of the plurality of images to acquire the image analysis information.

16. An image processing method comprising the steps of:
acquiring, using an image acquiring unit, an image group having a plurality of images owned by a user;
acquiring, using an image analysis information acquiring unit, image analysis information of each of the plurality of images;
determining, using a theme determiner, a theme of the image group from among predefined themes based on the image analysis information;
analyzing, using a preference analyzer, a preference of the user from among predefined preferences based on the theme of the image group;
selecting, using a composite image generator, a certain number of images corresponding to the preference of the user from among the plurality of images based on the image analysis information and using the certain number of images selected to generate composite images of a plurality of patterns selected from among predefined patterns; and
performing control, using a display controller, such that one composite image selected from among the composite images of the plurality of patterns is displayed on an image monitor and, based on an instruction input by way of an instruction input unit, the one composite image displayed on the image monitor is replaced with one composite image designated by the instruction from among the composite images of the plurality of patterns to display the one composite image designated on the image monitor.

17. The image processing method according to claim 16, wherein the display controller performs control such that a plurality of buttons corresponding to the respective composite images of the plurality of patterns are displayed on the image monitor together with the one composite image displayed on the image monitor and, based on an instruction input by way of the instruction input unit, the one composite image displayed on the image monitor is replaced with one composite image which is selected from among the composite images of the plurality of patterns and is corresponding to one button designated by the instruction from among the plurality of buttons to display the one composite image selected on the image monitor.

18. The image processing method according to claim 16, further comprising the steps of:
   selecting, using a candidate image selector, from among the plurality of images, a plurality of candidate images including an image or images being used in the one composite image displayed on the image monitor, as images to be used in editing a layout of the one composite image displayed on the image monitor; and
   performing control, using the display controller, such that the plurality of candidate images selected by the candidate image selector are displayed on the image monitor together with the one composite image displayed on the image monitor based on an instruction input by way of the instruction input unit.

19. The image processing method according to claim 16, further comprising the steps of:
   selecting, using a processing detail selector, a processing detail that corresponds to a pattern of the one composite image displayed on the image monitor from among a plurality of processing details included in each of a plurality of types of editing processing performed in editing the layout; and
   performing control, using the display controller, such that, based on an instruction input by way of the instruction input unit, the processing detail selected by the processing detail selector is displayed on the image monitor as a processing detail of a type of editing processing designated by the instruction, together with the one composite image displayed on the image monitor.

20. A non-transitory computer readable recording medium storing a program for causing a computer to execute each of the steps of the image processing method according to claim 16.

* * * * *